(12) United States Patent
Kumar

(10) Patent No.: US 7,679,298 B2
(45) Date of Patent: Mar. 16, 2010

(54) LOCOMOTIVE WHEEL SPEED CONTROL

(75) Inventor: Ajith Kuttannair Kumar, Erie, PA (US)

(73) Assignee: General Electric Company, Schenectady, NY (US)

(*) Notice: Subject to any disclaimer, the term of this patent is extended or adjusted under 35 U.S.C. 154(b) by 833 days.

(21) Appl. No.: 11/465,208

(22) Filed: Aug. 17, 2006

(65) Prior Publication Data
US 2008/0042602 A1  Feb. 21, 2008

(51) Int. Cl.
*H02P 7/00* (2006.01)
(52) U.S. Cl. ............................ 318/66; 318/34; 318/59; 318/64; 318/101; 318/268; 324/160; 324/161; 701/19; 701/20; 701/82
(58) Field of Classification Search .................. 318/66, 318/52, 55, 34, 59, 64, 101, 268; 388/800, 388/806, 808, 822, 823, 825; 307/53; 702/148, 702/96; 701/19, 20, 82; 324/160, 161
See application file for complete search history.

(56) References Cited

U.S. PATENT DOCUMENTS

| 4,924,395 | A | * | 5/1990 | Evans et al. ................... 701/71 |
|---|---|---|---|---|
| 5,436,538 | A | * | 7/1995 | Garvey et al. ................... 318/52 |
| 6,104,148 | A |   | 8/2000 | Kumar et al. |
| 6,148,269 | A | * | 11/2000 | Kumar et al. ................... 702/96 |
| 6,194,850 | B1 |  | 2/2001 | Kumar et al. |
| 6,359,346 | B1 |  | 3/2002 | Kumar |
| 6,532,405 | B1 |  | 3/2003 | Kumar et al. |
| 6,813,583 | B2 | * | 11/2004 | Kumar et al. ................ 702/148 |
| 2001/0035049 | A1 |  | 11/2001 | Balch et al. |

* cited by examiner

*Primary Examiner*—Rita Leykin
(74) *Attorney, Agent, or Firm*—Robert Wawrzyn, Esq.; Terry M. Sanks, Esq.; Beussse Wolter Sanks Mora & Maire, P.A.

(57) ABSTRACT

A method for controlling a wheel speed of a locomotive includes determining an estimated wheel speed (52) for a desired wheel set of a locomotive responsive to a locomotive operating parameter indicative of an actual wheel speed of the desired wheel set. The method also includes generating a first adjustment parameter (e.g., 46) based on an operating condition of the locomotive, and then applying the first adjustment parameter to the estimated wheel speed for generating a first adjusted estimated wheel speed signal (54) used as a first input for controlling a wheel speed of at least one of the desired wheel set and the other wheel sets of the locomotive.

23 Claims, 3 Drawing Sheets

LOCOMOTIVE WHEEL SPEED CONTROL

FIELD OF THE INVENTION

This invention relates to the field of control of locomotives, and in particular, to controlling a wheel speed of a locomotive.

BACKGROUND OF THE INVENTION

Locomotives and other large transit vehicles are typically powered by electric traction motors coupled to drive one or more axles of the vehicle. Locomotives typically have at least four axle wheel sets, with each axle-wheel set being connected via suitable gearing to the shaft of a separate electric motor commonly referred to as a traction motor. In a motoring operation, the traction motors are supplied with electric current from a controllable source of electric power, such as an engine driven traction alternator and apply torque to the vehicle wheels which exert tangential force, or tractive effort, on the surface on which the vehicle is traveling, such as the parallel rail of a railway in the case of a locomotive, thereby propelling the vehicle. In an electrical braking mode of operation, the motors serve as axle driven electrical generators such that torque is applied to their shafts by their respectively associated axle-wheel sets, which then exert braking effort on the surface, thereby retarding or slowing the vehicle's progress.

It is important to monitor the rotational speed of the axle wheel sets to limit undesirable operating conditions, such as excessive wheel creep. In some locomotives, the locomotive speed or tangential wheel speed is calculated from measured motor shaft revolutions per minute (RPM) values based on the diameter of the associated wheel. Typically, a speed sensor or revolution counter is coupled to sense the rotational speed of an output shaft of each drive motor. These RPM signals are converted to wheel rotational speed based on a known gear ratio of the mechanical coupling between the motor shaft and wheel axle. Rotational speed is then converted to vehicle linear speed based upon an assumed diameter of each driven wheel. Outputs of the speed sensors may be used to control an adhesion condition of the vehicle, such as creep of one or more wheels.

FIG. 1 shows a block diagram 10 illustrative of a prior art method for controlling a wheel speed of a direct current (DC) motor powered locomotive. The method illustrated by block diagram 10 includes generating a motor voltage control signal 12 based on speed sensor signals 14a . . . 14c provided, for example, by respective wheel speed sensors. In particular, the speed sensor signals 14a . . . 14c are used to generate a reference speed signal 20 that is indicative of an actual speed of the locomotive in block 16 and to generate a maximum speed signal 22 in block 18. The reference speed signal 20 may be subtracted from the maximum speed signal 22 to generate a creep offset signal 24 that is subtracted from a creep limit signal 26 to generate a creep error signal 28 provided to creep control block 30. The above steps assume the locomotive is being operated in a motoring condition. During a braking operation of the locomotive, suitable changes, such as using a minimum speed instead of maximum speed, a polarity of creep, etc., may need to be made in the above steps as would be understood by one skilled in the art. Creep control block 30 generates a creep control signal 32 that may be compared, in block 40, to a reference current signal 34, a voltage limit signal 36, and a reference horsepower limit signal 36 to determine a minimum among the signals 32, 34, 36, 38. A minimum of the signals 32, 34, 36, 38 may then be used to provide a motor voltage signal 12 to control a voltage applied to a traction motor of the locomotive. One problem with speed sensors is that they operate in an extreme environment and are prone to failure. Even one speed sensor failure on a four or six axle locomotive may require limiting, or de-rating, motoring and/or braking of the all axles of the locomotive until the sensor is repaired.

BRIEF SUMMARY OF THE INVENTION

In an embodiment, the invention includes a method for controlling a wheel speed of a locomotive. The method includes determining an estimated wheel speed for a desired wheel set of a locomotive responsive to a locomotive operating parameter indicative of an actual wheel speed of the desired wheel set and generating a first adjustment parameter based on an operating condition of the locomotive. The method also includes applying the first adjustment parameter to the estimated wheel speed for generating a first adjusted estimated wheel speed signal used as a first input for controlling a wheel speed of at least one of the desired wheel set and the other wheel sets of the locomotive.

In another embodiment, the invention includes a system for controlling a wheel speed of a locomotive that comprises a processor receiving an operating parameter of a locomotive indicative of an actual wheel speed of a desired wheel set of the locomotive and receiving information indicative of an operating condition of the locomotive. The system also includes programmed logic operable with the processor for determining an estimated wheel speed for the desired wheel set of the locomotive responsive to the operating parameter, for generating a first adjustment parameter based on the operating condition of the locomotive, and for applying the first adjustment parameter to the estimated wheel speed for generating an adjusted estimated wheel speed signal used as an input for controlling a wheel speed of at least one of the desired wheel set and the other wheel sets of the locomotive.

In another embodiment, the invention includes computer readable media containing program instructions for controlling a wheel speed of a locomotive, the computer readable media comprising a computer program code for determining an estimated wheel speed for a desired wheel set of a locomotive responsive to a locomotive operating parameter indicative of an actual wheel speed of the desired wheel set. The computer readable media also includes a computer program code for generating a first adjustment parameter based on an operating condition of the locomotive and a computer program code for applying the first adjustment parameter to the estimated wheel speed for generating an adjusted estimated wheel speed signal used as an input for controlling a wheel speed of at least one of the desired wheel set and the other wheel sets of the locomotive.

In another embodiment, the invention includes a method for controlling a wheel speed of a locomotive includes determining an estimated wheel speed for a desired wheel set of a locomotive responsive to a locomotive operating parameter indicative of an actual wheel speed of the desired wheel set. The method also includes generating an adjustment parameter based on a relationship between locomotive operating parameter indicative of an actual wheel speed of at least one other wheel set of the locomotive and a measured wheel speed of the least one other wheel set of the locomotive. The method further includes applying the adjustment parameter to the estimated wheel speed for generating an adjusted estimated wheel speed signal used as an input for controlling a wheel speed of at least one of the desired wheel set and the other wheel sets of the locomotive.

In another embodiment, the invention includes a method for controlling a wheel speed of a locomotive includes determining estimated wheel speeds for at least some wheel sets of a locomotive responsive to respective operating parameters of motors powering the wheel sets and generating a first wheel speed control signal based on the estimated wheel speeds. The method also includes generating a second wheel speed control signal based on measured wheel speeds of at least some of the wheel sets and using at least one of the first and second wheel speed control signals as an input for controlling a wheel speed of at least one wheel set of the locomotive.

In another embodiment, the invention includes a method for controlling a wheel speed of a locomotive comprising determining an estimated wheel speed for a wheel set of a locomotive having a malfunctioning speed sensor responsive to a locomotive operating parameter. The method also includes using speed sensor sensed wheel speeds of other wheel sets of the locomotive having functioning speed sensors to generate a wheel speed adjustment parameter and ignoring the estimated wheel speed when generating the wheel speed adjustment parameter.

DETAILED DESCRIPTION OF THE INVENTION

It has been proposed to determine a wheel speed of each wheel set of a DC motor powered locomotive based on operating characteristics of the DC traction motors instead of relying on a speed sensor associated with each wheel set. It is known that an estimate of wheel speed may be determined based on one or more of an armature current, a field coil current, an applied voltage, and/or an equivalent resistance of a DC traction motor associated with a wheel. For example, U.S. Pat. No. 6,813,583 describes such a method. Estimates of the wheel speeds of each wheel set of a locomotive determined in this manner may be used in conjunction with other operating parameters to control operation of the locomotive traction motors in response to the estimated wheel speeds. Use of this technique has been applied to estimate wheel speeds of all wheel sets of the locomotive. However, when only one or a few wheel sensors of a locomotive have malfunctioned, it would be desired to continue to operate the locomotive normally by using speed sensed wheel speeds of wheel sets of the locomotive having functioning speed sensors and using estimated speeds of wheel sets of the locomotive having malfunctioning speed sensors. Although one may calculate and apply an estimated speed for the wheel sets of the locomotive having malfunctioning speed sensors, a low estimate may result in an overestimate of creep of other axles, whereas a high estimate may result in an overestimate of creep for the axles for which the estimates are calculated. In addition, use of a raw estimated speed may result in an undesirable speed calculation error and/or an undesirably slow response time.

Figure 2:
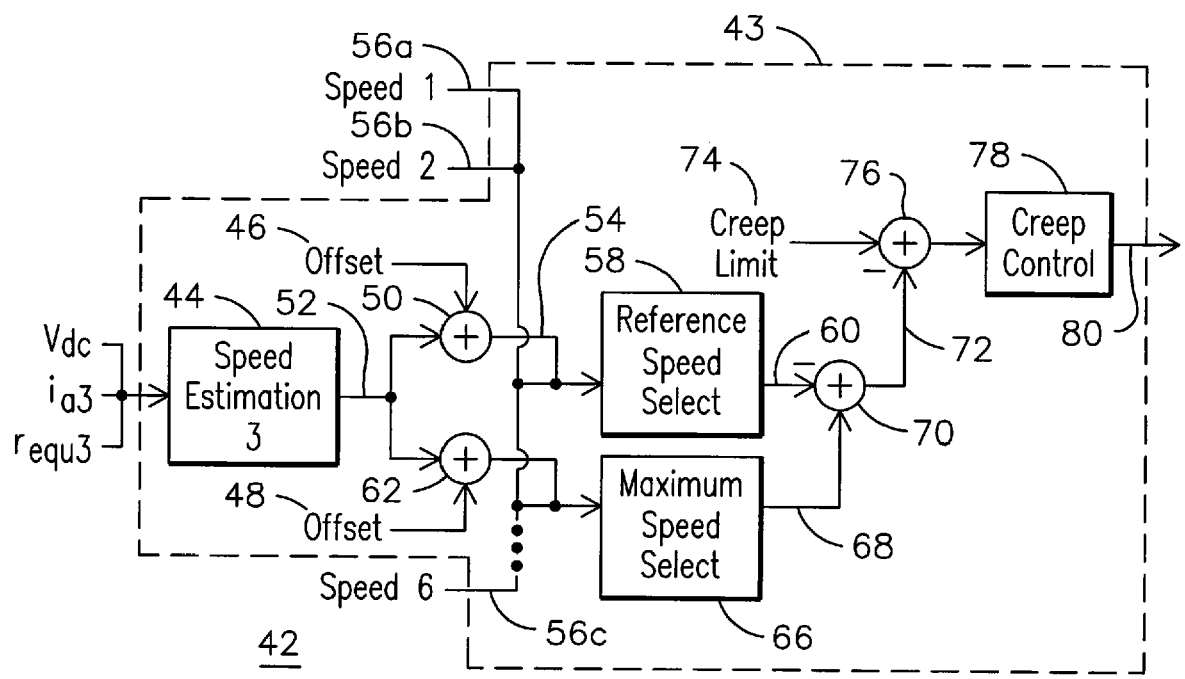
FIG. 2 is a block diagram illustrative of an example method for controlling a wheel speed of a locomotive.

FIG. 2 is a functional block diagram 42 illustrative of an example method of controlling a wheel speed of a locomotive, such as when the locomotive is experiencing one or more speed sensor malfunctions. The method may include adding an offset to an estimated speed of a wheel set for use in determining a reference speed of the locomotive. The method may also include subtracting an offset from an estimated speed of a wheel set for use in determining a wheel speed different than a reference speed of the locomotive, such as a maximum wheel speed among the wheel sets of a locomotive when motoring. The method includes, in block 44, determining an estimated wheel speed 52 for a wheel set of a locomotive, such as a wheel set of a locomotive experiencing a speed sensor malfunction, responsive to an operating parameter of a motor powering the wheel set. For example, when a speed sensor associated with wheel set number three of a six axle, DC motor powered locomotive has malfunctioned, a speed estimation may be calculated for wheel set three based on one or more of a DC voltage, Vdc, applied to the corresponding motor of the wheel set, a motor current, ia3, of the corresponding motor, and/or an equivalent resistance, req3, of the corresponding motor. Other components and/or parameters may be used for a speed estimation, such as temperature, inductance, and/or brush drop, etc. In the case of an AC powered locomotive, parameters such as synchronous motor speed, induction motor slip, Vac applied to the corresponding motor of the wheel set, frequency of a Vac applied to the motor, a motor current, ia, of the corresponding motor, and/or an equivalent resistance, req, of the corresponding motor.

The method may also include generating one or more adjustment parameters, such as one or more offsets 46, 48, based on locomotive operating conditions, such as at least one of operating parameters of respective motors powering other wheel sets of the locomotive and respective measured wheel speeds of other wheel sets of the locomotive. For example, offset 46 may be determined based on a first reference wheel speed among wheel speeds of other wheel sets of the locomotive, such as one or more wheel sets having functioning wheel speed sensors. The first reference wheel speed may be an estimate of the speed of the locomotive in the direction of torque being applied to the wheels of the locomotive and may be based on the wheel speeds of the locomotive wheel sets having functioning speed sensors. For example, the first reference speed may be based on an average of the wheel speeds of the locomotive wheel sets having functioning speed sensors. In other embodiments, adjustment parameters may be based on other operating conditions of the locomotive, such as tractive effort, acceleration, rail condition, etc.

The method may further include applying the adjustment parameter in block 50 to the estimated wheel speed 52, such as by adding offset 46 during a motoring operation, for generating a first adjusted estimated wheel speed signal 54 used as an input for controlling a wheel speed, such as creep, of the locomotive. The adjustment parameter, such as offset 46, may be based on a difference between the first reference wheel speed and the estimated wheel speed 52. The first adjusted estimated wheel speed signal 54, in conjunction with actual speed signals 56a, 56b, . . . , 56c received from wheels having functioning speed sensors, may be used for determining a second reference wheel speed 60 of the locomotive in block 58. Consequently, a reference speed 60 will be affected by the estimated wheel speed 52 only after an offset 46 is added or removed. In an embodiment, the offset 46 may be selected based on the expected error due to speed estimation. Accordingly, an error in one speed estimate does not affect the performance of other axles by having an erroneous locomotive speed estimate, thereby generating an erroneous creep estimate for the other axles of the locomotive. The above describes motoring operation condition when, as is understood in the art, a minimum speed is closer to the locomotive reference speed as a creep tends to increase the axle speed above the locomotive reference speed. Therefore an addition of offset 46 in 50 ensures that the estimated speed will be lower by the offset 46 before affecting reference speed. In a braking operation, the offset value should be subtracted since a maximum speed, as understood in the art, is closer to the locomotive reference speed because a wheel skid tends to decrease the axle speed below locomotive speed.

In another aspect of the invention, a second adjustment parameter, such as offset 48, may be applied in block 62 to the estimated wheel speed 52, such as by subtracting offset 48 during a motoring operation, for generating a second adjusted estimated wheel speed signal 64 used for controlling a wheel speed, such as wheel creep. The second offset 48 may be based on an estimated speed or reference speed, rail conditions, power being applied, tractive effort etc. Accordingly, a creep speed estimate of a speed estimated axle will be affected by the estimated wheel speed 52 after offset 48 is removed. The offset 48 may be selected based on an expected error due to estimation. Consequently, a small error in one speed estimate does not affect the performance of other axles by reducing power. A small error in axle speed estimate only affects the actual creep limit of the speed estimated axle and performance of this speed estimated axle. During a braking operation, block 62 may add the offset 48.

Figure 1:
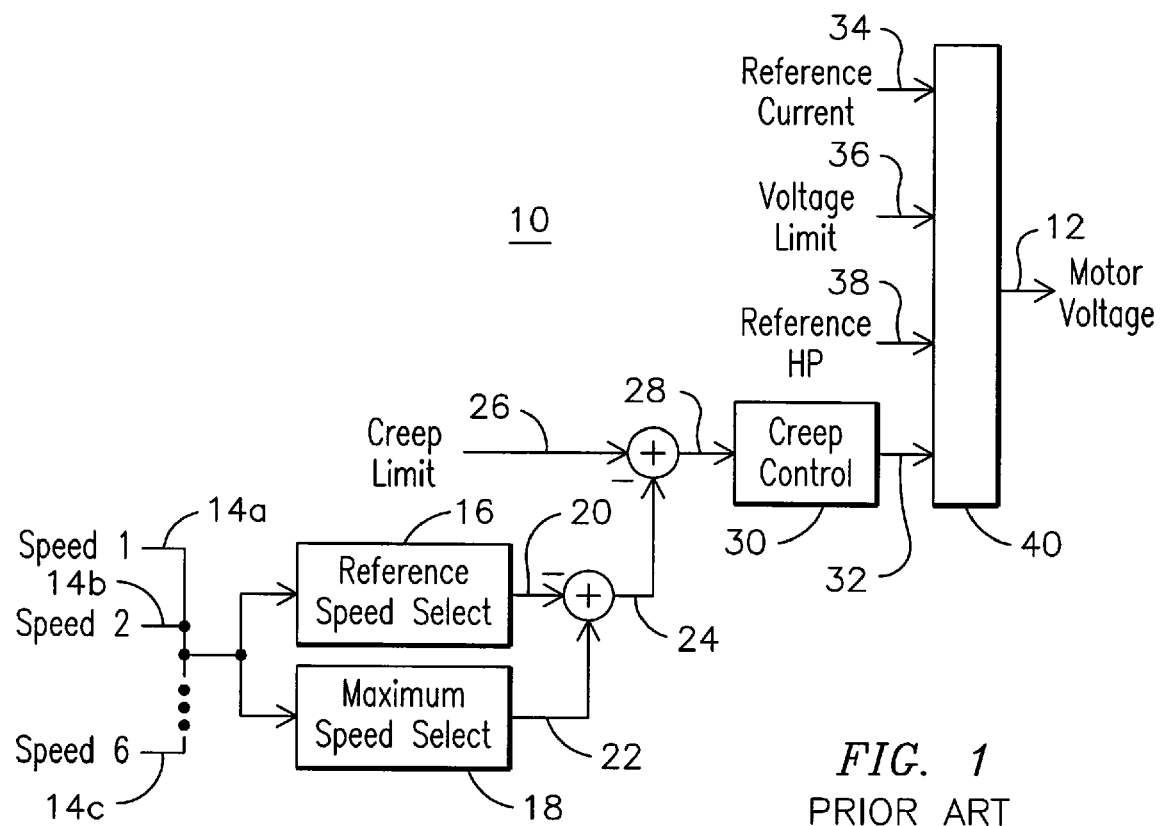
FIG. 1 is a block diagram illustrative of a prior art method for controlling a wheel speed of a locomotive.

The second adjusted estimated wheel speed signal 64, in conjunction with actual speed signals 56a, 56b, . . . , 56c received from wheels having functioning speed sensors, may be used for determining a maximum wheel speed 68 of the locomotive in block 66. The maximum wheel speed 68 may be used during motoring. Therefore, the output 68, represents a maximum amount of creep that may be present. Alternatively, block 66 may be configured to select a minimum speed during a locomotive braking operation. The second reference speed 60 and the maximum speed 68 may be combined at block 70 to generate a maximum creep indication signal 72 during motoring operation that may be combined with a creep limit 74 in block 76 to generate a creep control signal 80 in block 78. Alternatively block 70 may be configured to generate a minimum creep indication signal 72 during a braking operation. The creep control signal 80 may also be used as an input to block 40 of FIG. 1 to control one or more wheel speeds of the locomotive. The steps for performing the above described method may be embodied in a processor 43 encoded with programmed logic for performing the steps. Processor 43 may take any form known in the art, for example an analog or digital microprocessor or computer, and it may be integrated into or combined with one or more controllers used for other functions related to an operation of a locomotive.

Figure 3:
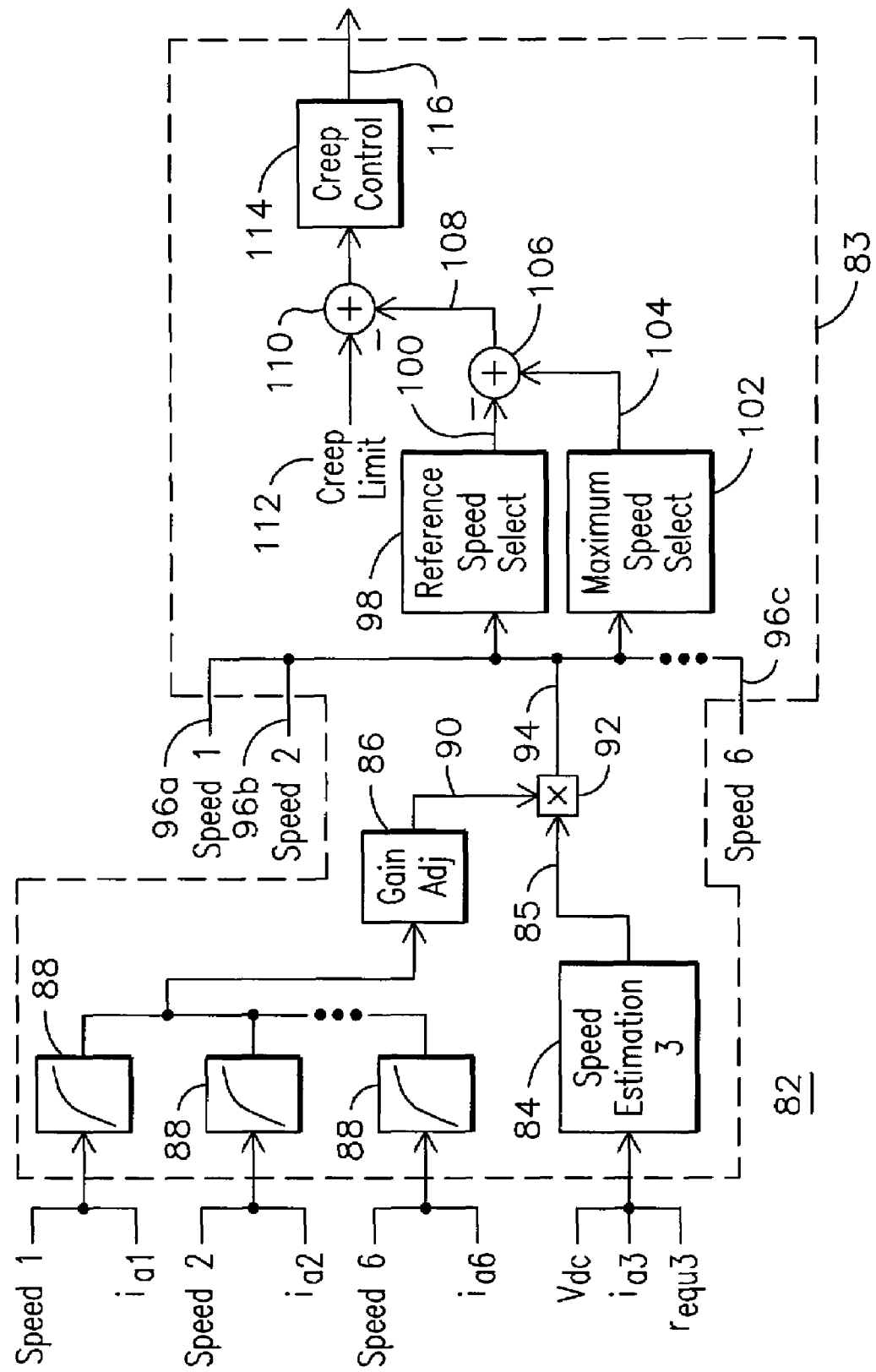
FIG. 3 is a block diagram illustrative of an example method for controlling a wheel speed of a locomotive.

FIG. 3 is a block diagram 82 illustrative of another example method for controlling a wheel speed of a locomotive. The method illustrated by block diagram 82 includes, in block 84, determining an estimated wheel speed 85 for a wheel set of a locomotive, such as a wheel associated with a malfunctioning wheel sensor, responsive to an operating parameter of a motor powering the wheel set. For example, a speed estimation may be calculated for wheel set three based on one or more of a DC voltage, Vdc, applied to the corresponding motor of the wheel set, a motor current, ia3, of the corresponding motor, an equivalent resistance, req3, of the corresponding motor and/or other parameters as described earlier.

In addition, the method may include generating an adjustment parameter 90, such as a gain adjustment, in block 86, based on at least one of an operating parameter of one or more motors powering other wheel sets of the locomotive and a measured wheel speed of other wheel sets of the locomotive. For example, respective relationships between a measured wheel speed and a motor operating parameter, such as a motor current, i, of the corresponding motor, for each of the wheel sets having functioning wheel sensors, may be determined in respective blocks 88. In an embodiment of the invention, the relationship may include a transfer function corresponding to wheel speed versus motor current. One or more of the respective relationships established in blocks 88 may then be used to generate the adjustment parameter 90 based on the relationships. The adjustment parameter may then be applied to the estimated wheel speed in block 92 for generating an adjusted estimated wheel speed signal 94 used as an input for controlling a wheel speed of the locomotive. Although a gain is shown in block 86, an offset, an offset combined with a gain, or any other transfer function may be used for correction. Another example of calculating the correction may be based on the measured speed of a motor, for example, motor 1, and the estimated speed of the same motor (motor 1) using functions similar to the block 84 (e.g. Ia1, Vdc, Req1, etc., of motor 1). The gain may include, for example, the ratio of an actual speed for motor 1 and estimated speed of motor 1. The gain adjustment block 86 could take the average gain of all the motors of the locomotive, or the median gain of all the motors, or a weighted average gain of all the motors, or the gain for the motor with the closest operating characteristics, etc.

The adjusted estimated wheel speed signal 94 may be substituted for a measured wheel speed signal normally provided to a locomotive wheel speed control system by a wheel speed sensor. For example, the adjusted estimated wheel speed signal 94, in conjunction with actual speed signals 96a, 96b, . . . , 96c received from wheel sets having functioning speed sensors, may be used for determining a reference wheel speed 100 in block 98 and/or a maximum wheel speed 104 of the locomotive in block 102. The reference wheel speed 100 and the maximum wheel speed 104 may be combined at block 106 to generate a creep indication signal 108 that may be combined with a creep limit 112 in block 110 to generate a creep control signal 116 in block 114. Creep control signal 116 may be used as an input to block 40 of FIG. 1 to control one or more wheel speeds of the locomotive. The steps for performing the above described method may be embodied in a processor 83 encoded with programmed logic for performing the steps. Processor 83 may take any form known in the art, for example an analog or digital microprocessor or computer, and it may be integrated into or combined with one or more controllers used for other functions related to an operation of a locomotive.

Figure 4:
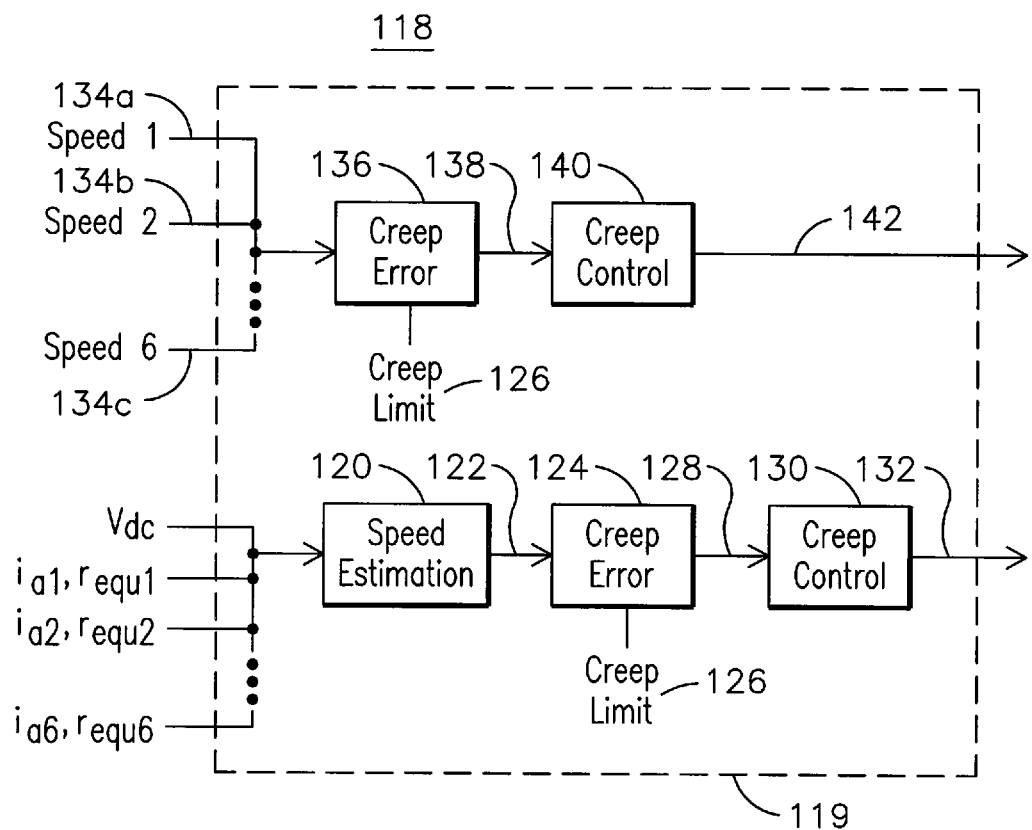
FIG. 4 is a block diagram illustrative of an example method for controlling a wheel speed of a locomotive.

FIG. 4 is a block diagram 118 illustrative of another example method for controlling a wheel speed of a locomotive. The method illustrated by block diagram 118 includes generating first and second creep control signals 132, 142, for use in controlling a creep condition of the locomotive. In particular, the method includes determining, in block 120, an estimated wheel speed 122 for each of the wheel sets of a locomotive responsive to operating parameters of motors powering the respective wheel sets. For example, the estimated speed 122 may determined for a DC motor powered locomotive based on one or more of a DC voltage, Vdc, applied to motors powering the wheel sets, respective a motor currents, i, and/or respective equivalent resistances, req, for each of the motors of the locomotive. The estimated speeds may then be compared, for example, to a creep limit 126 in block 124, to generate a first creep error signal 128. In block 124, the estimated speeds 122 may be used to generate a reference, a maximum, and/or a minimum speeds to generate a creep speed similar to actions performed in blocks 16, 18, 20, 22 and 24 described previously. This creep speed, in conjunction with creep limit 126, may be used to generate creep error signal 128. A first creep control signal 132 may be generated in block 130 based on the first creep error signal 128. The first creep control signal 132 may be used to as an input to block 40 of FIG. 1 to control one or more wheel speeds of the locomotive.

In addition to generating the first creep control signal 132, the method may include generating a second creep control signal 142 based on one or more actual speed signals 134a, 134b, ..., 134c provided by functioning wheel sensors. The actual speed signals 134a, 134b, ..., 134c may be used to create to generate a second creep error signal 138 in block 136 corresponding to the creep limit 146 (note that this creep limit may be different from creep limit 126). The second creep control signal 142 may be generated in block 140 based on the creep error signal 138. The second creep control signal 142 may also be used as an input to block 40 of FIG. 1 to control one or more wheel speeds of the locomotive. The limits, gains, time constants, etc., used in blocks 136 and 140 may be different from the ones used in blocks 124 and 130. For example, the response to a wheel creep using actual speed may be performed faster due to an accuracy of the information and due to the timeliness of the information. Similarly, the creep limit 126 for the creep control using the estimated speed may be higher than the creep limit 146 for the creep control using actual speeds. Another method of wheel slip control may be performed by comparing the current ia1, ia2, ia3 . . . to generate a current error similar to creep error 128. In other words, the estimated speed creep controllers using blocks 120, 124, 130 and 140 may use other signals such as current and ignore the contributions from resistance, voltage etc. The steps for performing the above described method may be embodied in a processor 119 encoded with programmed logic for performing the steps. Processor 119 may take any form known in the art, for example an analog or digital microprocessor or computer, and it may be integrated into or combined with one or more controllers used for other functions related to an operation of a locomotive.

Figure 5:
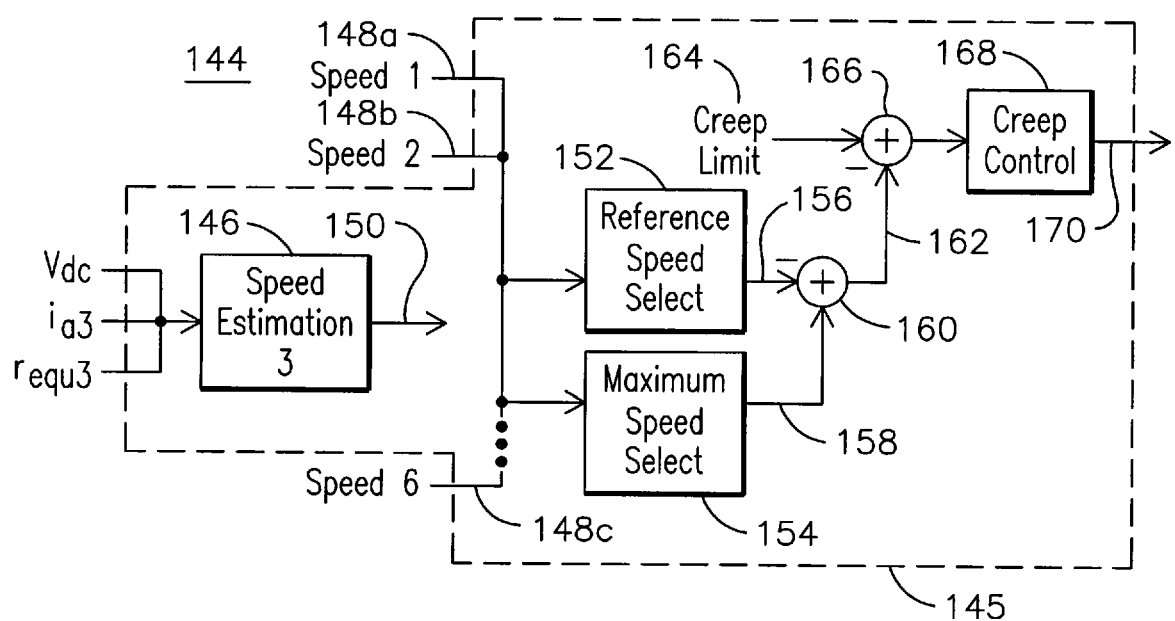
FIG. 5 is a block diagram illustrative of an example method for controlling a wheel speed of a locomotive.

FIG. 5 is a block diagram 118 illustrative of another example method for controlling a wheel speed of a locomotive. The method as illustrated by block diagram 144 includes, in block 146, determining an estimated wheel speed 150 for a wheel set of a locomotive, such as a wheel set of a locomotive experiencing a speed sensor malfunction, responsive to an operating parameter of a motor powering the wheel set. For example, when a speed sensor associated with wheel set three of a six axle, DC motor powered locomotive is malfunctioning, a speed estimation may be calculated for wheel set three based on one or more of a DC voltage, Vdc, applied to the corresponding motor of the wheel set, a motor current, ia3, of the corresponding motor, and/or an equivalent resistance, req3, of the corresponding motor. While the estimated wheel speed 150 may be used for other purposes in controlling a wheel speed of the locomotive, the estimated wheel speed 150 may be ignored when generating a creep control signal 170 for use in controlling a wheel speed of the locomotive. For example, estimated wheel speed 150 may be ignored by the one or both of the reference speed block 152 or maximum speed select block 154, or may be used by one of the blocks 152, 154.

The method may also include using one or more actual speed signals 134a, 134b, ..., 134c provided by functioning wheel sensors to generate a reference speed 156 and a maximum speed 158 in blocks 152, 154, respectively. The reference speed 156 and the maximum speed 158 may be combined at block 160 to generate a creep indication signal 162 that may be combined with a creep limit 164 in block 166 to generate a creep control signal 170 in block 168. The steps for performing the above described method may be embodied in a processor 145 encoded with programmed logic for performing the steps. The second creep control signal 170 may also be used as an input to block 40 of FIG. 1 to control one or more wheel speeds of the locomotive. Processor 145 may take any form known in the art, for example, an analog or digital microprocessor or computer, and it may be integrated into or combined with one or more controllers used for other functions related to an operation of a locomotive.

Based on the foregoing specification, the invention may be implemented using computer programming or engineering techniques including computer software, firmware, hardware or any combination or subset thereof, wherein the technical effect is to control a wheel speed of a locomotive. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A method for controlling a wheel speed of a locomotive comprising:

determining an estimated wheel speed for a desired wheel set of a locomotive responsive to a locomotive operating parameter indicative of an actual wheel speed of the desired wheel set;

generating a first adjustment parameter based on an operating condition of the locomotive; and applying the first adjustment parameter to the estimated wheel speed for generating a first adjusted estimated wheel speed signal used as a first input for controlling a wheel speed of at least one of the desired wheel set and the other wheel sets of the locomotive;

determining a reference wheel speed from among wheel speeds of one or more of other wheel sets of the locomotive; and using the reference wheel speed to generate the first adjustment parameter.

2. The method of claim 1, wherein the operating condition comprises at least one of locomotive operating parameters indicative of actual wheel speeds of motors powering other wheel sets of the locomotive, measured wheel speeds of the other wheel sets of the locomotive, tractive effort of the locomotive, acceleration of the locomotive, and track condition.

3. The method of claim 1, wherein the locomotive operating parameter indicative of an actual wheel speed of the desired wheel set comprises a motor operating parameter of the motor powering the desired wheel set.

4. The method of claim 3, wherein the motor operating parameter comprises at least one of a motor voltage, a motor current, a motor equivalent resistance, a motor temperature, a motor inductance, a motor brush drop, a synchronous motor speed, and a motor voltage frequency.

5. The method of claim 1, wherein the reference wheel speed comprises an estimate of the speed of the locomotive in the direction of torque being applied to the wheel sets of the locomotive.

6. The method of claim 1, further comprising determining a different wheel speed than the reference wheel speed from among wheel speeds of the other wheel sets of the locomotive and using the different wheel speed to generate a second adjustment parameter.

7. The method of claim 6, wherein the different wheel speed comprises a maximum wheel speed among the wheel speeds of the other wheel sets of the locomotive during a motoring condition.

8. The method of claim 6, wherein the different wheel speed comprises a minimum wheel speed among the wheel speeds of the other wheel sets of the locomotive during a braking condition.

9. The method of claim 1, further comprising determining an elevated wheel speed from among wheel speeds of other wheel sets of the locomotive and using the elevated wheel speed to generate a second adjustment parameter when the locomotive is in a motoring condition.

10. The method of claim 9, further comprising applying the second adjustment parameter to the estimated wheel speed for generating a second adjusted estimated wheel speed signal.

11. A method for controlling a wheel speed of a locomotive comprising:
    determining an estimated wheel speed for a desired wheel set of a locomotive responsive to a locomotive operating parameter indicative of an actual wheel speed of the desired wheel set;
    generating a first adjustment parameter based on an operating condition of the locomotive; and
    applying the first adjustment parameter to the estimated wheel speed for generating a first adjusted estimated wheel speed signal used as a first input for controlling a wheel speed of at least one of the desired wheel set and the other wheel sets of the locomotive; and
    determining a reduced wheel speed from among wheel speeds of other wheel sets of the locomotive and using the reduced wheel speed to generate a second adjustment parameter when the locomotive is in a braking condition.

12. The method of claim 11, further comprising applying the second adjustment parameter to the estimated wheel speed for generating a second adjusted estimated wheel speed signal.

13. A method for controlling a wheel speed of a locomotive comprising:
    determining an estimated wheel speed for a desired wheel set of a locomotive responsive to a locomotive operating parameter indicative of an actual wheel speed of the desired wheel set;
    generating a first adjustment parameter based on an operating condition of the locomotive; and
    applying the first adjustment parameter to the estimated wheel speed for generating a first adjusted estimated wheel speed signal used as a first input for controlling a wheel speed of at least one of the desired wheel set and the other wheel sets of the locomotive;
    generating a second adjustment parameter based on an operating condition of the locomotive; and
    applying the second adjustment parameter to the estimated wheel speed for generating a second adjusted estimated wheel speed signal used as a second input for controlling a wheel speed of at least one of the desired wheel set and the other wheel sets of the locomotive.

14. A method for controlling a wheel speed of a locomotive comprising:
    determining an estimated wheel speed for a desired wheel set of a locomotive responsive to a locomotive operating parameter indicative of an actual wheel speed of the desired wheel set;
    generating an adjustment parameter based on a relationship between locomotive operating parameter indicative of an actual wheel speed of at least one other wheel set of the locomotive and a measured wheel speed of the least one other wheel set of the locomotive; and
    applying the adjustment parameter to the estimated wheel speed for generating an adjusted estimated wheel speed signal used as an input for controlling a wheel speed of at least one of the desired wheel set and the other wheel sets of the locomotive;
    wherein the motor operating relationship comprises a transfer function corresponding to a motor operating parameter of the at least one other wheel set versus a measured wheel speed of the at least one other wheel set.

15. A method for controlling a wheel speed of a locomotive comprising:
    determining an estimated wheel speed for a desired wheel set of a locomotive responsive to a locomotive operating parameter indicative of an actual wheel speed of the desired wheel set;
    generating an adjustment parameter based on a relationship between locomotive operating parameter indicative of an actual wheel speed of at least one other wheel set of the locomotive and a measured wheel speed of the least one other wheel set of the locomotive; and
    applying the adjustment parameter to the estimated wheel speed for generating an adjusted estimated wheel speed signal used as an input for controlling a wheel speed of at least one of the desired wheel set and the other wheel sets of the locomotive;
    wherein the at least one other wheel set comprises a wheel set having an operating parameter closest to the operating parameter of the desired wheel set.

16. A method for controlling a wheel speed of a locomotive comprising:
    determining an estimated wheel speed for a desired wheel set of a locomotive responsive to a locomotive operating parameter indicative of an actual wheel speed of the desired wheel set;
    generating an adjustment parameter based on a relationship between locomotive operating parameter indicative of an actual wheel speed of at least one other wheel set of the locomotive and a measured wheel speed of the least one other wheel set of the locomotive; and applying the adjustment parameter to the estimated wheel speed for generating an adjusted estimated wheel speed signal used as an input for controlling a wheel speed of at least one of the desired wheel set and the other wheel sets of the locomotive;

wherein the motor operating relationship further comprises an average transfer function corresponding to motor operating parameters of at least some of the other wheel sets versus measured wheel speeds of the at least some of the other wheel sets.

17. A method for controlling a wheel speed of a locomotive comprising:

determining an estimated wheel speed for a desired wheel set of a locomotive responsive to a locomotive operating parameter indicative of an actual wheel speed of the desired wheel set;

generating an adjustment parameter based on a relationship between locomotive operating parameter indicative of an actual wheel speed of at least one other wheel set of the locomotive and a measured wheel speed of the least one other wheel set of the locomotive; and applying the adjustment parameter to the estimated wheel speed for generating an adjusted estimated wheel speed signal used as an input for controlling a wheel speed of at least one of the desired wheel set and the other wheel sets of the locomotive;

wherein the motor operating relationship further comprises an median transfer function corresponding to motor operating parameters of at least some of the other wheel sets verses measured wheel speeds of the at least some of the other wheel sets.

18. A method for controlling a wheel speed of a locomotive comprising;

determining an estimated wheel speed for a desired wheel set of a locomotive responsive to a locomotive operating parameter indicative of an actual wheel speed of the desired wheel set;

generating an adjustment parameter based on a relationship between locomotive operating parameter indicative of an actual wheel speed of at least one other wheel set of the locomotive and a measured wheel speed of the least one other wheel set of the locomotive;

applying the adjustment parameter to the estimated wheel speed for generating an adjusted estimated wheel speed signal used as an input for controlling a wheel speed of at least one of the desired wheel set and the other wheel sets of the locomotive; and substituting the adjusted estimated wheel speed signal for a measured wheel speed signal provided to a locomotive wheel speed control system.

19. A method for controlling a wheel speed of a locomotive comprising:

determining estimated wheel speeds for at least some wheel sets of a locomotive responsive to respective operating parameters of motors powering the wheel sets;

generating a first wheel speed control signal based on the estimated wheel speeds;

generating a second wheel speed control signal based on measured wheel speeds of at least some of the wheel sets;

using at least one of the first and second wheel speed control signals as an input for controlling a wheel speed of at least one wheel set of the locomotive.

20. The method of claim 19, wherein the at least some of the wheel sets comprise wheel sets having functioning speed sensors.

21. The method of claim 19, wherein the estimated wheel speeds are used to generate at least one of a reference speed, a maximum speed, and a minimum speed.

22. The method of claim 19, wherein the operating parameters comprise at least one of a motor voltage, a motor current, a motor equivalent resistance, a motor temperature, a motor inductance, a motor brush drop, a synchronous motor speed, and a motor voltage frequency.

23. A method for controlling a wheel speed of a locomotive comprising:

determining an estimated wheel speed for a wheel set of a locomotive having a malfunctioning speed sensor responsive to a locomotive operating parameter;

using speed sensor sensed wheel speeds of other wheel sets of the locomotive having functioning speed sensors to generate a wheel speed adjustment parameter; and ignoring the estimated wheel speed when generating the wheel speed adjustment parameter.

* * * * *